No. 733,222. Patented July 7, 1903.

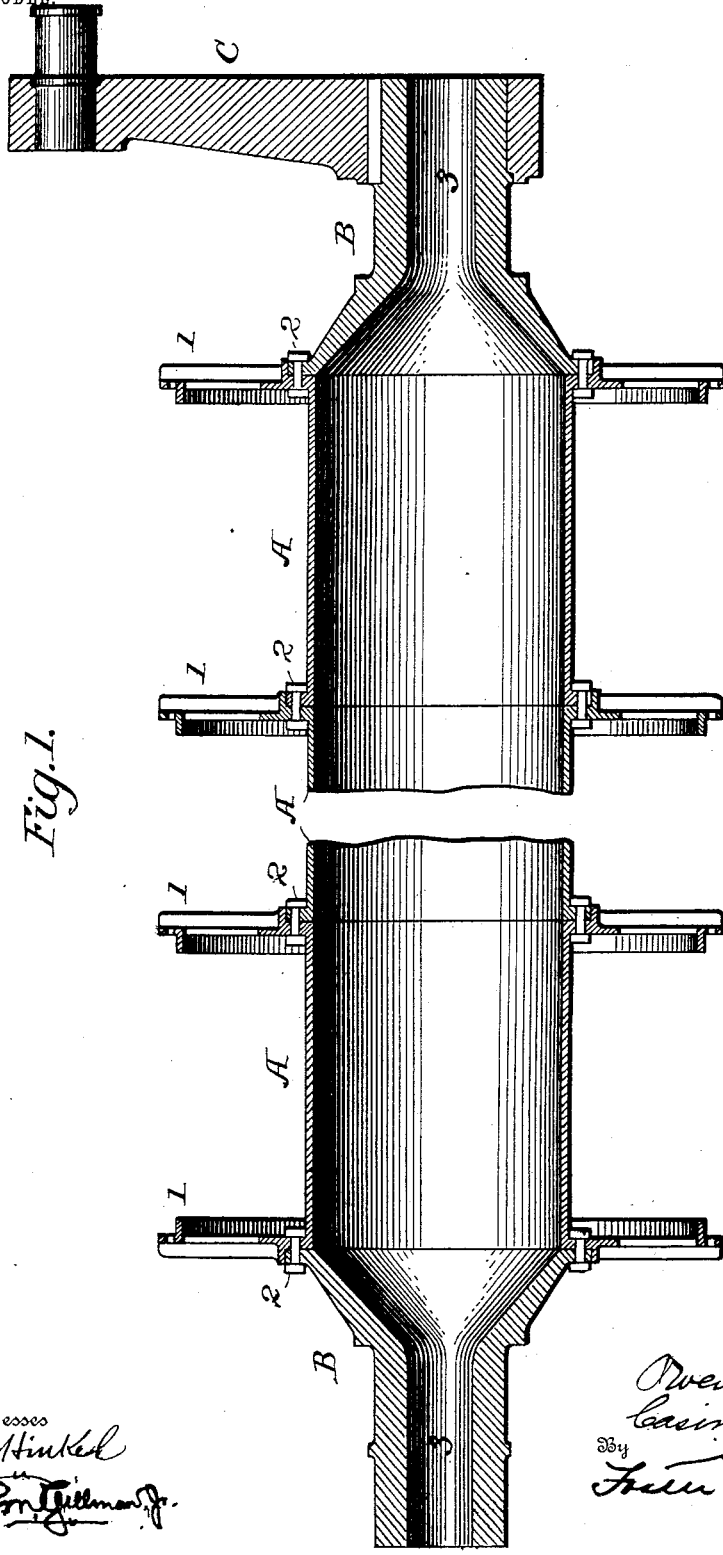

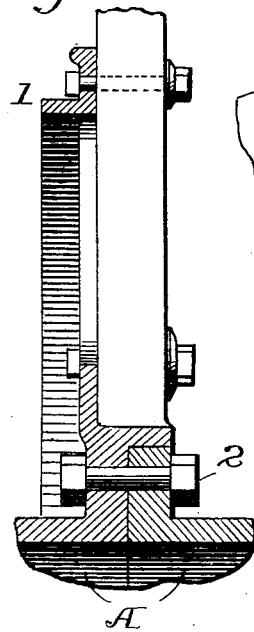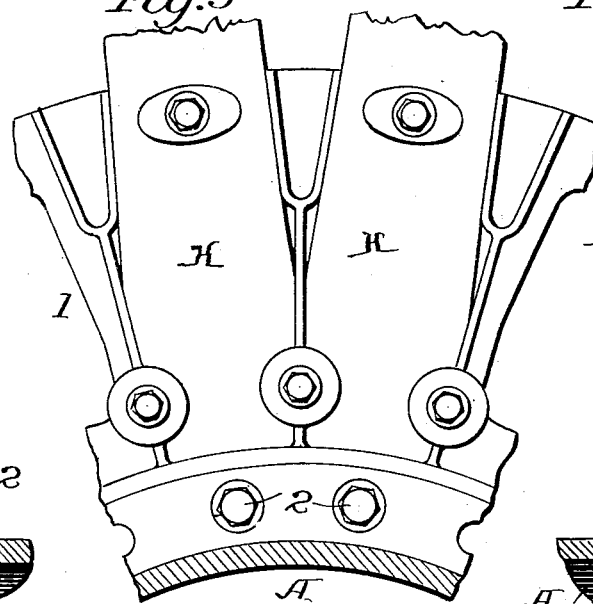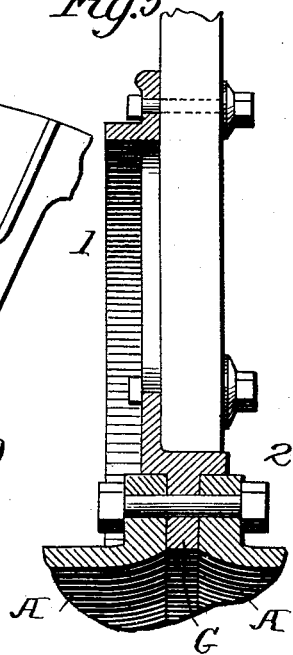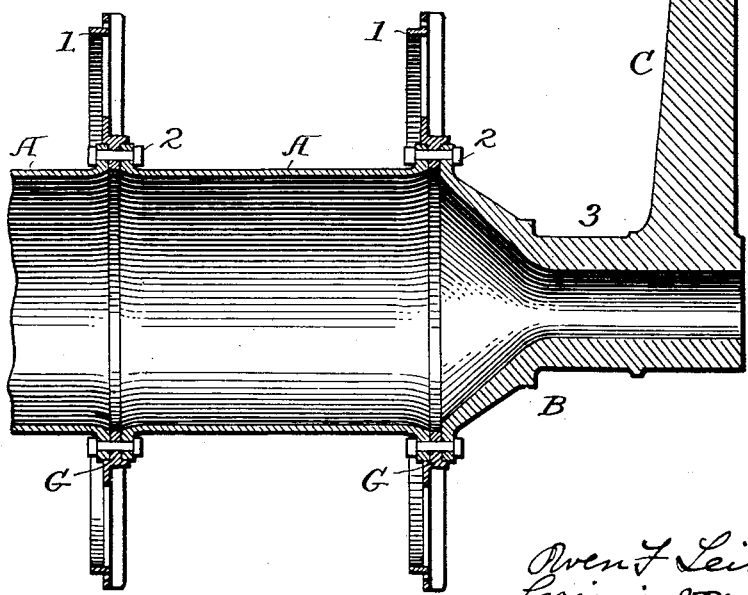

UNITED STATES PATENT OFFICE.

OWEN F. LEIBERT AND CASIMIR VON PHILP, OF BETHLEHEM, PENNSYLVANIA.

COMPOSITE SHAFT.

SPECIFICATION forming part of Letters Patent No. 733,222, dated July 7, 1903.

Application filed January 7, 1902. Serial No. 88,768. (No model.)

*To all whom it may concern:*

Be it known that we, OWEN F. LEIBERT and CASIMIR VON PHILP, citizens of the United States, residing at Bethlehem, in the county of Northampton and State of Pennsylvania, have invented certain new and useful Improvements in Composite Shafts, of which the following is a specification.

Our invention relates to shafts of that character which are adapted to rotate in bearings; and our invention consists in making the shaft of a plurality of body-sections with bearing members in such manner that the individual parts may be readily made and secured together without forging or bending or shaping the members as required in the manufacture of ordinary shafting, all as fully set forth hereinafter and as illustrated in the accompanying drawings, in which—

Figure 1 is a longitudinal section of a composite shaft embodying our invention with a crank-arm on one of the end members. Fig. 2 is an enlarged section showing the form of one of the flanges for supporting the spokes of a wheel; Fig. 3, a face view of the part shown in Fig. 2; Fig. 4, a sectional view of the end of the shaft, showing the crank-arm integral with the end bearing member and a different arrangement of the parts for supporting the spokes; Fig. 5, an enlarged section of the construction shown in Fig. 4 in connection with the spoke-supports.

The body of the shaft consists of a plurality of members A, which may be of any suitable form and proportions and which are so constructed that they may be connected together end to end, as by means of flanges, through which pass bolts 2. Each member consists of a single continuous piece of metal—as, for instance, a cast-metal flanged cylinder—and the flanges 1 of some of the members may be enlarged or extended to provide means for attachment of the spokes H of a water-wheel or other structure carried by the shaft.

Combined with the body members and in line therewith are bearing members B, each of which is constructed for ready attachment to the end of the adjacent body member and each of which is formed into a journal 3, which is adapted to a bearing of suitable character, in which bearings the shaft rotates. As shown in the drawings, the bearing members B are at the ends of the body of the shaft; but there may be one or more bearing members in the line of the shaft when supports intermediate the ends are required. Preferably in most instances the bearing members are also of cast metal each in one continuous piece; but, if necessary, they may be forged. When the crank is at the end of the shaft, the end bearing member is provided with a crank-arm C, which may be keyed to the bearing member, as shown in Fig. 1, or it may be cast integral therewith, as shown in Fig. 4, and the flanges 1, which support the wheel or other structure, instead of being integral with the body members may be upon independent ring members G, clamped between the flanges of the body members and secured by bolts, as indicated in Fig. 5.

A composite shaft of the character above described has many advantages over the usual continuous shafts, whether solid or hollow, and over shafts built up of curved sections of plate or wrought metal. Among these advantages it is stronger, lighter, and cheaper. Being hollow and of large diameter in comparison with its weight, it may be floated for transportation. It can readily be repaired if any part is broken, and spare parts can be easily and cheaply supplied, so as to be kept on hand for use in case of accident. Further, the parts of the shaft can be produced in any good foundry or foundry and machine-shop, as their manufacture does not require the use of a forge, while the parts may be connected together by such appliances as can be found in any ordinary smithy. When the crank-arm is cast upon and integral with the end bearing member, which is practicable in many instances, the structure can be made much lighter and does not require any machining for its manufacture or the application of keys or the shrinking of the arm in place. It will also be evident that when the body members are cylindrical in shape they may be made without the use of patterns in the same manner that cast-metal pipe is now made.

Without limiting ourselves to the precise construction and arrangement shown, we claim as our invention—

1. A composite shaft consisting of flanged members and of members provided with journals integral therewith, all the members being bolted together, substantially as set forth.

2. A composite shaft consisting of a plurality of members connected end to end, each member consisting of a single continuous piece, and certain of the members formed to constitute journals integral therewith and adapted to bearings supporting the shaft, substantially as set forth.

3. A composite shaft, the body portion of which consists of a plurality of connected members each composed of a single continuous piece, with end members having reduced journals integral therewith, substantially as set forth.

4. A composite shaft, the body portion of which consists of a plurality of connected members each composed of a single continuous piece, with end members having journals and crank-arms integral therewith, substantially as set forth.

5. A composite shaft having a body portion consisting of a plurality of connected members, each of one continuous piece of metal, and flanges upon some of the members and formed integral therewith and adapted for the support of members of a wheel, substantially as set forth.

6. A composite shaft having a body portion consisting of a plurality of connected members, each of one continuous piece of metal, and flanges supported by the shaft and adapted to support the members of a wheel, and shaft members provided with reduced journals integral therewith, substantially as set forth.

In testimony whereof we have signed our names to this specification in the presence of two subscribing witnesses.

OWEN F. LEIBERT.
CASIMIR VON PHILP.

Witnesses:
ADELE S. LEIBERT,
LAURA M. SCHWAB.